United States Patent [19]

Sopcak et al.

[11] 4,045,996
[45] Sept. 6, 1977

[54] TEST FIXTURE FOR LEAK DETECTORS

[75] Inventors: James E. Sopcak, Chicago; Walter Rowland, Darien, both of Ill.

[73] Assignee: The Continental Group, Inc., New York, N.Y.

[21] Appl. No.: 723,358

[22] Filed: Sept. 15, 1976

[51] Int. Cl.² .............................................. G01M 3/26
[52] U.S. Cl. ..................................................... 73/1 R
[58] Field of Search .................... 73/1 R, 1 G, 40, 41, 73/45, 45.2, 45.3, 45.4

[56] References Cited

U.S. PATENT DOCUMENTS

| 2,979,937 | 4/1961 | Chausson | 73/1 G |
| 3,117,479 | 1/1964 | Bisdis | 73/1 R |

Primary Examiner—S. Clement Swisher
Attorney, Agent, or Firm—John J. Kowalik; Joseph E. Kerwin; William A. Dittmann

[57] ABSTRACT

An improved test fixture for verifying the reliability of leak detectors in a can-making line, comprising a can body having an orifice of a predetermined size formed therein and piece of filter paper of predetermined porosity, attached to the interior of the container by a double-faced tape, overlying the orifice. A fluid, maintained at a predetermined pressure, is introduced into the body to produce a simulated leak having a predetermined flow rate. Identification of the test fixture as a "leaker" proves the reliability of the leak detector.

A method is also provided for producing the test fixture.

8 Claims, 3 Drawing Figures

TEST FIXTURE FOR LEAK DETECTORS

BACKGROUND AND SUMMARY OF THE INVENTION

The present invention relates to can making and, more specifically, to testing of cans for leaks or similar defects.

In the manufacture of cans and can end closures, it is desirable to test the finished product prior to shipment. This may be accomplished by pressurizing the container and then measuring the pressure after a suitable time lapse. If the initial pressure has decreased, indicating the presence of a leak, the can may be rejected. Alternatively, the pressurized can may be placed in a sealed chamber which is initially at a predetermined pressure below the initial pressure of the can. If the can is defective, the pressure within the chamber will increase as the pressurant passes from the can into the chamber.

Performance of tests of the type just described has been automated to permit testing of all units of the product, rather than mere testing of random samples. The test equipment is designed to reject any unit which permits the loss of approximately 9 c.c. of air, pressurized to 10 p.s.i.g., within a 10 second interval. At present, calibration of the equipment to verify that defective units are indeed being rejected, is a time consuming, and hence costly, process.

It is therefore a primary object of the present invention to provide an improved test fixture for rapidly and reliably verifying the proper operation of can testing equipment.

This is accomplished by providing a test unit having a simulated leak permitting a loss of pressurant slightly in excess of the predetermined maximum allowable, whereby rejection of the test unit indicates proper performance of the test equipment.

It is a further object to provide a method for producing the aforementioned test fixture.

With the above and other objects in view that will hereinafter appear, the nature of the invention will be more readily understood by reference to the following description, the appended claims and the several views illustrated in the accompanying drawings.

DESCRIPTION OF THE PREFERRED EMBODIMENT

In keeping with the present invention, there is provided a container shell comprising a cylindrical metal can body 1, having a metal end closure 2 at one end thereof. The body 1 and end closure 2 may be separate pieces joined by a circumferential double-folded seam 3, as shown in FIG. 1, or an integrally formed body 1 and end closure 2, as shown in FIG. 2.

Figure 1:
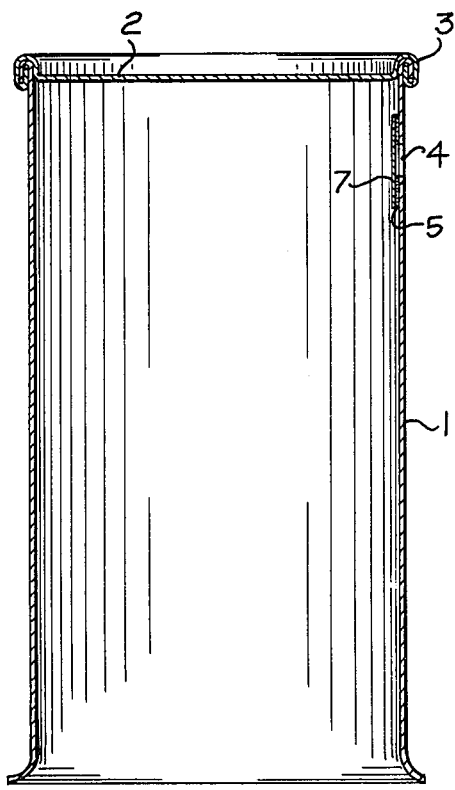
FIG. 1 is a fragmentary cross-sectional view of one embodiment of the present invention.
Figure 2:
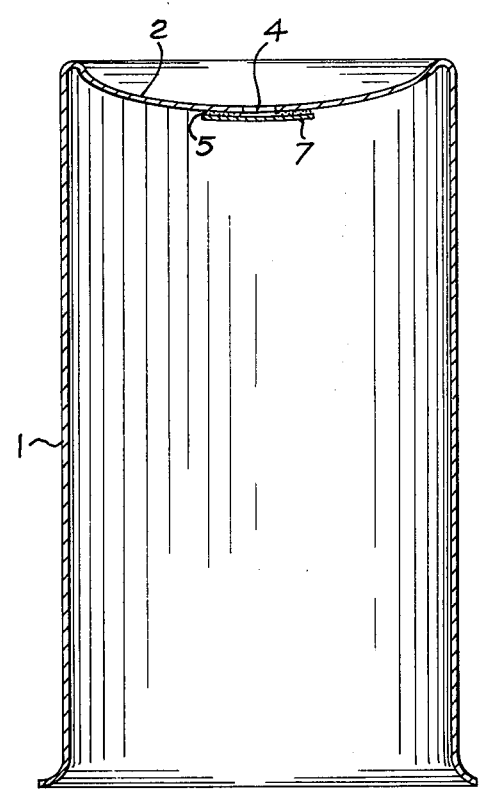
FIG. 2 is a fragmentary isometric view of a second embodiment of the present invention.
Figure 3:
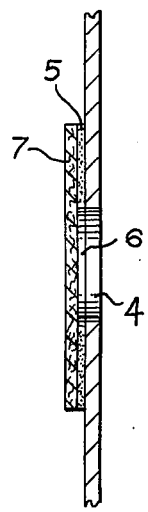
FIG. 3 is an enlarged cross-sectional view of the controlled flow port of the present invention.

A hole 4, of approximately 0.033 inches in diameter, is formed in either the body 1, as shown in FIG. 1, or in the end closure 2, as shown in FIG. 2. A hole of this size may be produced using a No. 66 drill bit. It is preferred that the hole 4 be drilled from the inside of the container shell so that any burr is on the outside surface thereof.

If it is desired to form the hole 4 in the end closure 2 of a two-piece container, as shown in FIG. 2, it is necessary to drill from without. In this case, all burr should be removed by grinding and polishing.

Next, a peice of double-faced adhesive tape is applied to the inner surface of the shell, in covering relation to the hole 4. In practice, it has been found that Avery Double-Faced Adhesive, produced by the Avery Label Company of Chicago, Ill. and indentified as part No. T.D. 5779, is suitable for this purpose. A disc 5 is punched from the adhesive tape, leaving both protective coverings in place. The coating is then removed from one side of the material and the disc 5 is pressed firmly in place over the hole 4. When the disc 5 is in position, the remaining protective coating is removed. After the second coating has been removed, the shell is held before a light source and a fine pointed object is used to pierce a hole 6 through the tape, from within the container. The hole 6 in the disc 5 should be the same size as the hole 4 in the shell.

Next, a disc 7 is punched from a piece of filter paper having an average pore size of 0.45 microns. Type HAWP 02500 filter paper, produced by the Milipore Filter Corporation of Bedford, Massachusetts, has been found suitably for this purpose. The filter disc 7 is placed over the adhesive disc 5 and pressed firmly into place with a new pencil eraser.

The test fixture as thus produced will permit the passage of approximately 9 c.c. of air in 10 seconds, when subjected to an initial pressure of 10 p.s.i.g. Simulated leaks of this sort may be used in multiples to produce greater flow rates, i.e. three leaks would produce a combined flow rate of 27 c.c. in 10 seconds.

In use, the test fixture is placed in the line of completed cans and run through the test equipment. Failure of the equipment to reject the test fixture as having an unacceptable leak, indicates the need for recalibration or other adjustment.

We claim:

1. An improved test fixture for verifying the proper operation of leak detectors in a can-making line, comprising a can having a body, a closure on one end of said body, an orifice of a predetermined size formed in said can, and a filtering medium of predetermined porosity affixed to said can covering said orifice, and means for introducing a test fluid, maintained at a predetermined pressure, into said can to produce a simulated leak having a predetermined flow rate.

2. The test fixture of claim 1, wherein said filtering medium is affixed to said can by a double-faced adhesive tape.

3. The test fixture of claim 2, wherein said filtering medium comprises a filter paper of predetermined porosity.

4. A method for producing a test fixture for verifying the proper operation of a leak detector in a can-making line, comprising the steps of:
   a. providing a can body having a closure on one end thereof;
   b. forming an orifice of a predetermined size in one of said can body and said closure;
   c. applying an adhesive material to the interior surface of said one of said body or said end closure, surrounding and adjacent said orifice; and
   d. affixing a filtering medium to said adhesive material in covering relation to said orifice.

5. The method of claim 4, wherein said orifice is formed in a manner such that any burr is located on the exterior surface of said one of said body or said closure.

6. The method of claim 4, wherein said adhesive material is double-faced adhesive tape applied over said orifice, and a hole is peirced through said tape, in line with said orifice, after application thereof to said one of said body and said end closure.

7. A test fixture can having an aperture of predetermined size, and a filter covering the aperture affixed to the can, said can adapted to be introduced into a can line having a leakage test fixture for testing the operativeness of said leakage fixture.

8. A test can for insertion into a can-making line in a location to pass through a can tester to determine the operability of said tester, said test can comprising a can having a body, a closure on one end of said body, means for introducing a test fluid, maintained at a predetermined pressure, into said can, and a simulated leak, having a predetermined flow rate at said predetermined pressure, said simulated leak comprising an orifice of a predetermined size formed in said can and a filtering medium of predetermined porosity affixed to said can covering said orifice.

* * * * *